UNITED STATES PATENT OFFICE.

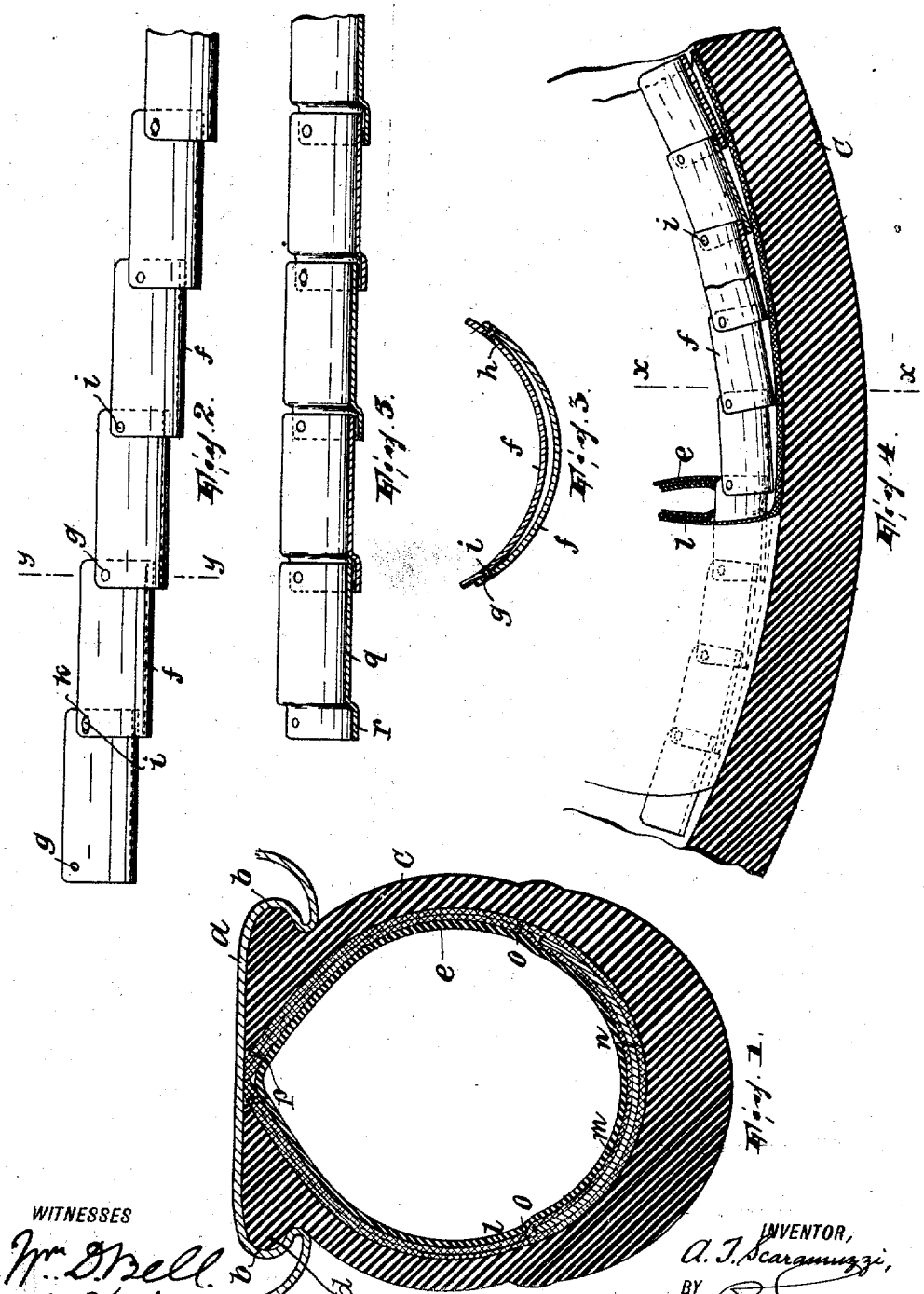

ANTONY T. SCARAMUZZI, OF PATERSON, NEW JERSEY.

VEHICLE-WHEEL TIRE.

956,735. Specification of Letters Patent. Patented May 3, 1910.

Application filed September 18, 1909. Serial No. 518,368.

*To all whom it may concern:*

Be it known that I, ANTONY T. SCARAMUZZI, a citizen of the United States, residing in Paterson, Passaic county, New Jersey, have invented a certain new and useful Improvement in Vehicle-Wheel Tires; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to inflated vehicle-wheel tires and particularly to that class of such tires which employ inner tubes, and it has for its object to provide means for preventing puncturing of the tire while allowing the tire to retain the desired elasticity and resiliency.

A further object is to make a tire of the kind indicated puncture-proof without its being specially constructed to that end and so that a tire already in use may be readily fitted with the protecting means. To this end I provide a series of articulated puncture-resisting leaves or plates, each cross-sectionally shaped to conform substantially to the curvature of the cross-section of the tread of the tire, inclosing them in a tough, durable casing, preferably formed of sheets of leather lying against the upper and lower sides of the leaves or plates and so formed as to confine the leaves or plates against lateral movement in the casing; this casing, besides resisting puncturing influences to a large extent on its own account, serves, partly by adhering to the inside of the tire proper under the pressure of the inner tube and partly by abutting against a stop formed, say, by the rim of the wheel, to prevent the protecting means from creeping laterally, and at the same time it assumes the wear of the articulating plates or leaves, particularly at their ends, and allows the series of plates some slight slip in the direction of the circumference of the tire, so that the wearing points of the plates or leaves on the casing and consequently on the tread-portion of the tire proper are constantly changing.

I have fully illustrated my invention in the accompanying drawing, wherein,

Figure 1 is a cross-sectional view of a tire provided with the improved protecting means, on line $x$—$x$, Fig. 4; Fig. 2 shows, in side elevation, several of the leaves or plates extended; Fig. 3 is a sectional view on line $y$—$y$ of Fig. 3; Fig. 4 is a longitudinal sectional view of the tread-portion of the tire proper and shows the protecting means in side elevation, partly broken away; and Fig. 5 is a longitudinal sectional view showing a modified construction of the leaves or plates.

$a$ designates the rim of the wheel having the opposed grooves $b$; $c$ is the tire proper having the lateral ribs or flanges $d$ adapted to lock in the grooves $b$; and $e$ is the inner tube.

$f$ designates one of a series of plates, preferably formed of metal; the blank from which said plate is produced is rectangular in shape and when the plate is completed it has the cross-sectional curvature shown in Fig. 3 and at each of its four corners a hole $g$, $h$, the two holes $h$ being slightly farther from the lateral edges of the plate than the other two, $g$. Said plates are secured together in a circular series by means of rivets $i$, which form pivots allowing the plates to articulate on each other; the holes $h$ in one plate being farther removed from its lateral edges than the holes $g$ are from the lateral edges of the next adjoining plate, each plate is eccentric with respect to the other, allowing the pivotal movement. At one or more points in the circular series of plates, where necessary, the holes $g$ (or $h$) may be elongated, as shown at $k$, Fig. 2, to permit a slight expansion and contraction of the series.

The series of plates is inclosed in a tough durable casing or envelop $l$, preferably composed of leather. Said casing comprises strips of leather $m$ and $n$ stitched together along the lines $o$ and also, preferably, along the lines $p$, parallel with their longitudinal edges; the casing is sufficiently wide so that, while lying flat against the inner surface of the tire proper when the inner tube is inflated, the longitudinal edges thereof will abut against each other and also against some part of the structure enveloping it, as the rim $a$.

In assembling the parts of a vehicle wheel thus constructed, the protecting means may be first introduced, being placed in the disposition shown in Fig. 1; then the inner tube is inserted between the longitudinal edges of the casing, the tire proper interlocked with the grooves of the rim and the inner tube inflated. The plates, while protecting the inner tube from being punctured, permit the tire to retain its resiliency and elasticity both because they are articulated and because expansion and contraction are allowed in the series of plates at the points $k$. Movement of the protecting means in the lateral direction is prevented by the edges of the casing abutting against each other and against the rim, and movement thereof in the longitudinal direction is prevented by the adhesion which exists between the casing and the inner surface of the tire proper under the pressure of the inner tube; folding or buckling of the casing is therefore avoided. On the other hand, the plates $f$ being of metal and (in the adaptation shown) having each but limited contact with the casing, some slight movement of the series of plates longitudinally in the casing is permitted, the same having the effect of changing the points of wear of said plates on the casing constantly.

In Fig. 5 the plates $q$ are formed and interconnected the same as the plates $f$, only one end of each is bent out of the plane of the body portion thereof, as at $r$, so as to afford a broader surface for contact with the outer wall $n$ of the casing.

Having thus fully described my invention, what I claim as new and desire to secure by Letters Patent is:—

The combination of the rim of a vehicle wheel, a tire proper having its lateral edges interlocked with the rim and spaced continuously from each other, an inner tube arranged in the tire-proper, and a puncture-resisting medium interposed between the tire-proper and the inner tube and comprising an endless series of puncture-resisting devices articulatively connected with each other and arranged in the tread-portion of the tire between the tire-proper and the inner tube and stiff flexible strips receiving between them said devices and each having its lateral edges abutting against each other opposite the space between the lateral edges of the tire-proper, both edges of the outer strip engaging the rim between said lateral edges of the tire-proper, substantially as described.

In testimony, that I claim the foregoing, I have hereunto set my hand this 17th day of September, 1909.

ANTONY T. SCARAMUZZI.

Witnesses:
 JOHN W. STEWARD,
 WM. D. BELL.